(12) United States Patent
Tupe et al.

(10) Patent No.: US 9,951,213 B2
(45) Date of Patent: *Apr. 24, 2018

(54) MULTISTAGE PROCESS FOR PRODUCING POLYETHYLENE COMPOSITIONS

(71) Applicant: BOREALIS AG, Vienna (AT)

(72) Inventors: Ravindra Tupe, Helsinki (FI); Jani Aho, Helsinki (FI); Markku Vahteri, Porvoo (FI); Tuomas Noopila, Helsinki (FI); Jarmo Kela, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/032,939

(22) PCT Filed: Dec. 12, 2014

(86) PCT No.: PCT/EP2014/077547
§ 371 (c)(1),
(2) Date: Apr. 28, 2016

(87) PCT Pub. No.: WO2015/086813
PCT Pub. Date: Jun. 18, 2015

(65) Prior Publication Data
US 2016/0272799 A1 Sep. 22, 2016

(30) Foreign Application Priority Data
Dec. 13, 2013 (EP) .................................... 13197040

(51) Int. Cl.
| C08L 23/08 | (2006.01) |
| C08F 210/16 | (2006.01) |
| C08F 4/02 | (2006.01) |

(52) U.S. Cl.
CPC ........ C08L 23/0815 (2013.01); C08F 210/16 (2013.01); *C08F 4/025* (2013.01); *C08L 2205/025* (2013.01)

(58) Field of Classification Search
CPC ...... C08F 210/16; C08F 297/08; C08F 2/001; C08L 23/0815; C08L 2205/025; C08L 2205/03; C08J 5/18
See application file for complete search history.

(56) References Cited

U.S. PATENT DOCUMENTS

| | | | |
|---|---|---|---|
| 3,242,150 A | 3/1966 | Scoggin | |
| 3,324,093 A | 6/1967 | Alleman | |
| 3,374,211 A | 3/1968 | Marwil et al. | |
| 3,405,109 A | 10/1968 | Rohlfing | |
| 4,543,399 A | 9/1985 | Jenkins, III et al. | |
| 4,578,879 A | 4/1986 | Yokoyama et al. | |
| 4,582,816 A | 4/1986 | Miro | |
| 4,621,952 A | 11/1986 | Aronson | |
| 4,803,251 A | 2/1989 | Goode et al. | |
| 4,855,370 A | 8/1989 | Chirillo et al. | |
| 4,933,149 A | 6/1990 | Rhee et al. | |
| 5,026,795 A | 6/1991 | Hogan | |
| 5,391,654 A | 2/1995 | Ahvenainen et al. | |
| 2011/0288237 A1* | 11/2011 | Gustafsson | C08F 10/02 525/240 |

FOREIGN PATENT DOCUMENTS

| | | |
|---|---|---|
| EP | 0 047 077 A1 | 3/1982 |
| EP | 0 188 125 A2 | 7/1986 |
| EP | 0 250 169 A2 | 12/1987 |
| EP | 0 372 239 A2 | 6/1990 |
| EP | 0 479 186 A2 | 4/1992 |
| EP | 0 499 759 A1 | 8/1992 |
| EP | 0 560 035 A1 | 9/1993 |
| EP | 0 579 426 A1 | 1/1994 |
| EP | 0 600 414 A1 | 6/1994 |
| EP | 0 683 176 A1 | 11/1995 |
| EP | 0 684 671 A1 | 11/1995 |
| EP | 0 688 794 A1 | 12/1995 |
| EP | 0 691 367 A1 | 1/1996 |
| EP | 0 696 293 B1 | 2/1996 |
| EP | 0 699 213 B1 | 3/1996 |
| EP | 0 707 513 B1 | 4/1996 |
| EP | 0 721 798 A2 | 7/1996 |
| EP | 0 773 258 A2 | 5/1997 |
| EP | 0 810 235 A2 | 12/1997 |
| EP | 0 891 990 A2 | 1/1999 |
| EP | 1 310 295 A1 | 5/2003 |
| EP | 1 378 528 A1 | 1/2004 |
| EP | 1 415 999 A1 | 5/2004 |
| EP | 1 591 460 A1 | 11/2005 |
| EP | 1 600 276 A1 | 11/2005 |
| EP | 2 067 799 A1 | 6/2009 |
| EP | 2 186 833 A1 | 5/2010 |
| EP | 2 228 394 A1 | 9/2010 |
| GB | 1 272 778 | 5/1972 |
| WO | WO 94/25495 A1 | 11/1994 |
| WO | WO 96/19503 A1 | 6/1996 |
| WO | WO 96/32420 A1 | 10/1996 |
| WO | WO 97/50093 A1 | 12/1997 |

(Continued)

OTHER PUBLICATIONS

Geldart et al.; The Design of Distributors for Gas-Fluidized Beds; Powder Technology; vol. 42; 1985.

(Continued)

*Primary Examiner* — Roberto Rabago
(74) *Attorney, Agent, or Firm* — Richard M. Klein; Fay Sharpe LLP

(57) ABSTRACT

The present invention is a process for producing low density copolymers of ethylene and alpha-olefins having from 4 to 10 carbon atoms in three polymerization stages in the presence of an olefin polymerization catalyst where a low molecular weight copolymer of ethylene is produced in two of the stages and a high molecular weight copolymer in one of the stages. The resulting copolymers have a low density of not more than 920 kg/m$^3$.

18 Claims, No Drawings

(56) References Cited

FOREIGN PATENT DOCUMENTS

| | | |
|---|---|---|
| WO | WO 99/51646 A1 | 10/1999 |
| WO | WO 00/26258 A1 | 5/2000 |
| WO | WO 00/29452 A1 | 5/2000 |
| WO | WO 01/05845 A1 | 1/2001 |
| WO | WO 01/55230 A1 | 8/2001 |
| WO | WO 02/088194 A1 | 11/2002 |
| WO | WO 03/106510 A1 | 12/2003 |
| WO | WO 2005/087361 A1 | 9/2005 |
| WO | WO 2005/118655 A1 | 12/2005 |
| WO | WO 2006/066952 A1 | 6/2006 |
| WO | WO 2007/025640 A1 | 3/2007 |

OTHER PUBLICATIONS

Geldart; Gas Fluidization Technology; J. Wiley & Sons; 1986.
International Search Report for PCT/EP2014/077547 dated Mar. 3, 2015.

\* cited by examiner

MULTISTAGE PROCESS FOR PRODUCING POLYETHYLENE COMPOSITIONS

FIELD OF THE INVENTION

The present invention is directed to a method of producing ethylene polymers. Especially, the present invention is directed to a method of making multimodal ethylene polymers where the method comprises polymerizing ethylene in three polymerization stages. Further, the present invention is directed to multimodal ethylene copolymers produced by the process and to the use of such copolymers for making films.

PRIOR ART AND PROBLEM TO BE SOLVED

It is known to produce ethylene copolymers suitable for producing films by copolymerizing ethylene in two polymerization stages, for instance from EP-A-691367 which discloses bimodal ethylene copolymers produced in two fluidized bed reactors. The document does not disclose a third polymerization stage or the content of heptane-soluble polymer.

Also EP-A-773258 discloses blends of bimodal LLDPE resins with unimodal LLDPE. The bimodal LLDPE preferably has a density of from 0.91 to 0.930 g/ccm, an HLMI of 45 to 145 g/10 min and melt flow ratio HLMI/MI of 50 to 150 (p. 5, lines 38-42). The example discloses a density of 0.921 g/ccm, HLMI of 122 g/10 min and HLMI/MI of 99.

WO-A-97/50093 discloses bimodal LLDPE resins suitable for cable insulation. In examples it discloses a Copolymer E which was reported to be a bimodal LLDPE having a density of 0.913 g/ccm, MI of 0.6 g/10 min and HLMI of 50 g/10 min. The document is silent as to the manufacturing method.

EP-A-2067799 discloses multimodal LLDPE resins which have been produced in two polymerization stages in a loop and a gas phase reactor in the presence of a ligand-modified catalyst.

EP-A-2228394 discloses LLDPE polymers produced in two polymerization stages using a multicomponent catalyst comprising titanium and vanadium compounds. The document discloses that it is possible to include further polymerization stages, such as a third and a fourth polymerization stage which are preferably conducted in gas phase. It does not, however, disclose the nature of the polymers produced in such stages and it exemplifies only two-stage polymerization. Further, the document does not disclose the amount of the soluble polymer.

EP-A-2186833 discloses a three-stage polymerization in a cascaded reactor sequence of two loop reactors followed by a gas phase reactor. In the first stage a polymer having an $MFR_2$ of preferably 200 to 1000 g/10 min and a density of preferably 945 to 978 kg/m$^3$. The polymer produced in the second stage had an $MFR_2$ of preferably 200 to 1000 g/10 min and a density of preferably 945 to 978 kg/m$^3$. The final polymer had an $MFR_{21}$ of preferably 5 to 30 g/10 min and a density of preferably 940 to 970 kg/m$^3$. The polymers produced in the first and second stages had the same $MFR_2$. In the exemplified process the polymers produced in the first two stages were homopolymers and the final resins had $MFR_5$ of from 0.2 to 0.4 g/10 min and density of about 955 kg/m$^3$. WO-A-2006/066952 discloses a process for producing bimodal linear low density polyethylene having a density of from 903 to 920 kg/m$^3$ by copolymerizing ethylene and an alpha-olefin comonomer in two polymerization stages in the presence of a metallocene catalyst.

In view of the prior art there still remains a problem for producing LLDPE polymers having a low density and which can be extruded to films having good sealing properties, optical properties and mechanical properties at a high throughput.

SUMMARY OF THE INVENTION

As seen from one aspect the present invention provides a process for producing copolymers of ethylene and at least one alpha-olefin having from 4 to 10 carbon atoms in the presence of a polymerization catalyst, the copolymer having a density of from 906 to 920 kg/m$^3$ and a melt flow rate $MFR_5$ measured at 190° C. under 5 kg load of from 0.5 to 5.0 g/10 min in three polymerization stages comprising the steps of copolymerizing ethylene and a first alpha-olefin having from 4 to 10 carbon atoms in a first polymerization stage in the presence of the polymerization catalyst to produce a first copolymer of ethylene having a density of from 945 to 955 kg/m$^3$ and a melt flow rate $MFR_2$ measured at 190° C. under 2.16 kg load of from 150 to 1000 g/10 min;

copolymerizing ethylene and the first alpha-olefin in a second polymerization stage in the presence of the first copolymer of ethylene to produce a first copolymer mixture comprising the first copolymer of ethylene and a second copolymer of ethylene, the first copolymer mixture having a density of from 945 to 955 kg/m$^3$ and a melt flow rate $MFR_2$ of from 150 to 1000 g/10 min;

copolymerizing ethylene and a second alpha-olefin in a third polymerization stage in the presence of the first copolymer mixture to produce a second copolymer mixture comprising the first copolymer mixture and a third copolymer of ethylene, the second copolymer mixture having a density of from 906 to 920 kg/m$^3$ and a melt flow rate $MFR_5$ of from 0.5 to 5.0 g/10 min;

recovering the second copolymer mixture.

As seen from another aspect, the present invention provides films comprising an ethylene copolymer composition comprising a multimodal ethylene copolymer, said multimodal ethylene copolymer having a density p of from 906 to 916 kg/m$^3$;

a melt flow rate $MFR_5$ of from 0.5 to 5.0 g/10; and a flow rate ratio $FRR_{21/5}$ of from 15 to 35.

As seen from still another aspect, the present invention provides the use of the above-mentioned multimodal ethylene copolymer for making films.

DETAILED DESCRIPTION

Even though the present invention relates to a three-stage process for producing ethylene polymer compositions it should be understood that the process may contain additional polymerization stages to the three stages disclosed above. It may contain additional polymerization stages, such as a prepolymerization stage, as long as the polymer produced in such additional stages does not substantially influence the properties of the polymer. Furthermore, any one of the three polymerization stages disclosed above may be conducted as two or more sub-stages, provided that the polymer produced in each such sub-stage as well as their mixture matches the description for the polymer for the respective stage.

However, it is preferred to conduct each of the first, second and third polymerization stage as a single polymerization stage in order to prevent the process from becoming unnecessarily complex. Therefore, in the most preferred embodiment the process consists of three polymerization stages which may be preceded a prepolymerization stage.

By multimodal copolymer is meant a copolymer which contains distinct components having different average molecular weights or different contents of comonomer or both. The multimodal copolymer is produced by copolymerizing ethylene and a comonomer in two or more polymerization stages where the polymerization conditions are sufficiently different to allow production of different polymers in different stages. Alternatively, the multimodal copolymer may be produced in a single polymerization stage by using two or more different catalysts or by using a multicomponent catalyst comprising compounds of at least two different transition metals.

By continuously operating process is meant a process or a process stage into which the feedstock materials are continuously or intermittently introduced and from which the product is continuously or intermittently withdrawn. By continuous addition or withdrawal is meant that an uninterrupted stream goes in or flows out of the process or process stage. By intermittent addition or withdrawal is meant that during the operation of the process small batches of raw material are constantly added into or product is constantly withdrawn from the process or process stage. The cycle time between such batches is small compared to the overall average residence time of the process or process stage, such as not more than 10% of the overall average residence time.

According to the most preferred embodiment the polymerization process of the present invention is conducted in a cascaded sequence comprising two loop reactors followed by a gas phase reactor.

Catalyst

The polymerisation is conducted in the presence of an olefin polymerisation catalyst. The catalyst may be any catalyst which is capable of producing the desired ethylene polymer. Suitable catalysts are, among others, Ziegler-Natta catalysts based on a transition metal, such as titanium, zirconium and/or vanadium catalysts. Ziegler-Natta catalysts are useful as they can produce polymers within a wide range of molecular weight with a high productivity.

Suitable Ziegler-Natta catalysts preferably contain a magnesium compound, an aluminium compound and a titanium compound, optionally supported on a particulate support.

The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has median particle size from 6 to 40 µm, preferably from 6 to 30 µm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly useful.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

Prepolymerization

The polymerization steps may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step is conducted in slurry.

Thus, the prepolymerization step may be conducted in a loop reactor. The prepolymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from about 0.1 to 1000 grams of monomer per one gram of solid catalyst component is polymerized in the prepolymerization step. As the person skilled in the art knows, the catalyst particles recovered from a continuous prepolymerization reactor do not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420.

The catalyst components are preferably all introduced to the prepolymerization step when a prepolymerization step is present. However, where the solid catalyst component and the cocatalyst can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

First Polymerization Stage

In the first polymerization stage a first copolymer of ethylene and a first alpha-olefin having from 4 to 10 carbon atoms is produced. This is done by introducing a polymerization catalyst, optionally through the prepolymerization stage as described above, into the first polymerization stage together with ethylene, alpha-olefin comonomer and hydrogen.

The first copolymer of ethylene has a melt flow rate $MFR_2$ of from 150 to 1000 g/10 min, preferably from 150 to 750 g/10 min and more preferably from 200 to 600 g/10 min. Furthermore, the first copolymer has a density of from 945 to 955 kg/m$^3$, preferably from 945 to 953 kg/m$^3$ and most preferably from 948 to 953 kg/m$^3$.

The first polymerization stage is conducted as a particle form process. In such a process the polymerization catalyst is introduced into the first polymerization stage in particle form, preferably through the prepolymerization step as described above. The first copolymer of ethylene then grows on the catalyst particles thereby forming a mixture of a fluid reaction mixture and the particles comprising the first copolymer.

The first polymerization stage is preferably conducted as a slurry polymerization. The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 1 to about 50% by mole, preferably from about 2 to about 20% by mole and in particular from about 2 to about 10% by mole. The benefit of having a high ethylene concentration is that the productivity of the catalyst is increased but the drawback is that more ethylene then needs to be recycled than if the concentration was lower.

The temperature in the first polymerization stage is typically from 60 to 100° C., preferably from 70 to 90° C. An excessively high temperature should be avoided to prevent partial dissolution of the polymer into the diluent and the fouling of the reactor. The pressure is from 1 to 150 bar, preferably from 40 to 80 bar.

The slurry polymerization may be conducted in any known reactor used for slurry polymerization. Such reactors include a continuous stirred tank reactor and a loop reactor. It is especially preferred to conduct the polymerization in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3324,093, EP-A-479186 and U.S. Pat. No. 5,391,654. It is thus preferred to conduct the first polymerization stage as a slurry polymerization in one or more loop reactors, more preferably in one loop reactor.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerization stage continuously.

Hydrogen is introduced into the first polymerization stage for controlling the $MFR_2$ of the first copolymer. The amount of hydrogen needed to reach the desired MFR depends on the catalyst used and the polymerization conditions. The desired polymer properties have been obtained in slurry polymerization in a loop reactor with the molar ratio of hydrogen to ethylene of from 100 to 1000 mol/kmol (or mol/1000 mol) and preferably of from 200 to 800 mol/kmol.

The first alpha-olefin comonomer is introduced into the first polymerization stage for controlling the density of the first copolymer. As discussed above, the comonomer is an alpha-olefin having from 4 to 10 carbon atoms, preferably 1-butene, 1-hexene or 1-octene, more preferably 1-butene. The amount of comonomer needed to reach the desired density depends on the comonomer type, the catalyst used and the polymerization conditions. The desired polymer properties have been obtained with 1-butene as the comonomer in slurry polymerization in a loop reactor with the molar ratio of comonomer to ethylene of from 100 to 1000 mol/kmol (or mol/1000 mol) and preferably of from 200 to 800 mol/kmol.

The average residence time in the first polymerization stage is typically from 20 to 120 minutes, preferably from 30 to 80 minutes. As it is well known in the art the average residence time τ can be calculated from:

$$\tau = \frac{V_R}{Q_o} \qquad \text{(eq. 1)}$$

Where $V_R$ is the volume of the reaction space (in case of a loop reactor, the volume of the reactor, in case of the fluidized bed reactor, the volume of the fluidized bed) and $Q_o$ is the volumetric flow rate of the product stream (including the polymer product and the fluid reaction mixture).

The production rate in the first polymerization stage is suitably controlled with the catalyst feed rate. It is also possible to influence the production rate by suitable selection of the monomer concentration in the first polymerization stage. The desired monomer concentration can then be achieved by suitably adjusting the ethylene feed rate into the first polymerization stage.

Second Polymerization Stage

In the second polymerization stage a first copolymer mixture comprising the first copolymer of ethylene and a second copolymer of ethylene is formed. This is done by introducing the particles of the first copolymer, containing active catalyst dispersed therein, together with additional ethylene into the second polymerization stage. Hydrogen and the first alpha-olefin comonomer are introduced for controlling the molecular weight and density, respectively, as described above for the first polymerization stage. This causes the second copolymer to form on the particles containing the first copolymer. In some embodiments, the first copolymer mixture comprises from 25 to 60% by weight, preferably from 30 to 60%, of the first copolymer and from 40 to 75% by weight, preferably from 40 to 70%, of the second copolymer.

The melt flow rate $MFR_2$ of the first copolymer mixture is from 150 to 1000 g/10 min, preferably from 150 to 750 g/10 min and more preferably from 200 to 600 g/10 min. Furthermore, the density of the first copolymer mixture is from 945 to 955 kg/m³, preferably from 945 to 953 kg/m³ and most preferably from 948 to 953 kg/m³.

The density of the second copolymer cannot be measured because the second copolymer cannot be isolated from the first copolymer mixture. However, the density of the second copolymer can be estimated from the densities of the first copolymer mixture and the first copolymer by using the equation:

$$\rho_b = w_1 \cdot \rho_1 + w_2 \cdot \rho_2 \quad \text{(eq. 2)}$$

Where $\rho$ is the density in kg/m³, w is the weight fraction of the component in the mixture and subscripts b, 1 and 2 refer to the overall mixture b (=first copolymer mixture), component 1 (=first copolymer) and component 2 (=second copolymer), respectively.

The polymerization in the second polymerization stage is advantageously conducted as a slurry polymerization as described above for the first polymerization stage. The conditions can be selected to be close to those of the first polymerization stage. The temperature in the first polymerization stage is thus suitably from 60 to 100° C., preferably from 70 to 90° C. The pressure is suitably from 1 to 150 bar, preferably from 40 to 80 bar. Preferably the second polymerization stage is conducted in one or more loop reactors, more preferably in one loop reactor.

Hydrogen feed is adjusted to achieve a desired melt flow rate (or molecular weight) of the first copolymer mixture. Suitably, the hydrogen feed is controlled to maintain constant hydrogen to ethylene molar ratio in the reaction mixture. The actual ratio depends on the catalyst as well as the type of the polymerization. The desired polymer properties have been obtained in slurry polymerization in a loop reactor by maintaining the ratio within the range of from 200 to 1000 mol/kmol, preferably from 200 to 800 mol/kmol.

The first alpha-olefin comonomer is introduced into the second polymerization stage for controlling the density of the first copolymer mixture. The amount of the comonomer needed to reach the desired density depends on the comonomer type, the catalyst used and the polymerization conditions. The desired polymer properties have been obtained in slurry polymerization with 1-butene as the comonomer in a loop reactor with the molar ratio of comonomer to ethylene of from 100 to 1000 mol/kmol (or mol/1000 mol) and preferably of from 200 to 800 mol/kmol.

The desired polymer production rate in the second polymerization stage may be reached by suitably selecting the ethylene concentration in the second polymerization stage, in the same way as was described above for the first polymerization stage.

The average residence time in the second polymerization stage is typically from 20 to 120 minutes, preferably from 30 to 80 minutes.

The first polymer mixture comprises from 30 to 50% by weight of the first copolymer and from 50 to 70% by weight of the second copolymer. Preferably, the first copolymer mixture comprises from 35 to 45% by weight of the first copolymer and from 55 to 65% by weight of the second copolymer.

Typically at least a part of the fluid reaction mixture present in the second polymerization stage is removed from the polymer. This makes it possible to have a sufficient difference between the molecular weights of the polymers produced in the second polymerization stage and the third polymerization stage. The first polymer mixture is then directed to the third polymerization stage whereas the fluid reaction mixture may be directed to a recovery section or alternatively, the removed fluid reaction mixture may be returned wholly or partly into the first or the second polymerization stage. In the recovery section the components of the reaction mixture are separated to produce, for instance, recovered streams of ethylene, comonomer and diluent. The recovered streams may then be reused in the polymerization process. The removal of the fluid reaction mixture from the polymer may be done by any means known in the art, such as by flashing or extracting. Flashing is usually preferred because it is a simple and effective process. For instance EP-A-1415999 discloses a suitable method for transferring the polymer from the second polymerization stage to the third polymerization stage.

Third Polymerization Stage

In the third polymerization stage a second copolymer mixture comprising the first copolymer mixture and a third copolymer of ethylene is formed. This is done by introducing the particles of the first copolymer mixture, containing active catalyst dispersed therein, together with additional ethylene and a second alpha-olefin comonomer into the third polymerization stage. Hydrogen may be introduced for controlling the molecular weight. This causes the third copolymer to form on the particles containing the first copolymer mixture. The first, second, and third polymerization stages may be conducted continuously. Optionally, the process comprises the additional steps of:

withdrawing a stream comprising a first fluid reaction mixture and the first copolymer from the first polymerization stage and passing said stream into the second polymerization stage;

withdrawing a stream comprising a second fluid reaction mixture and the first copolymer mixture from the second polymerization stage and passing it to a separation stage;

withdrawing from said separation stage a first stream which is substantially free of the first copolymer mixture and comprises the second fluid reaction mixture and a second stream which comprises the first copolymer mixture and a reduced content of the second fluid reaction mixture;

passing said second stream to the third polymerization stage, and passing at least a part of said first stream to hydrocarbon recovery or returning at least a part of said first stream to the first polymerization stage or to the second polymerization stage.

The melt flow rate $MFR_5$ of the second copolymer mixture is from 0.5 to 5.0 g/10 min, preferably from 0.8 to 4.0 g/10 min. The second copolymer mixture preferably has $MFR_{21}$ of from 20 to 150 g/10 min, more preferably 25 to 100 g/10 min. Furthermore, it preferably has the flow rate ratio $FRR_{21/2}$ of 15 to 40, preferably 18 to 25.

The second alpha-olefin comonomer is selected from alpha-olefins containing 4 to 10 carbon atoms. The content of the comonomer is controlled to obtain the desired density of the second copolymer mixture. Typically the second copolymer mixture has a density of from 906 to 920 $kg/m^3$, preferably from 906 to 916 $kg/m^3$, more preferably from 910 to 916 $kg/m^3$ and even more preferably from 910 to 915 $kg/m^3$.

As explained above for the first copolymer mixture, the $MFR_{21}$ of the third copolymer of ethylene cannot be measured because the third copolymer cannot be isolated from the second copolymer mixture. However, the $MFR_{21}$ of the third copolymer of ethylene can be calculated by using the so called Hagström equation (Hagström, The Polymer Processing Society, Europe/Africa Region Meeting, Gothenburg, Sweden, Aug. 19-21, 1997).

$$MI_b = \left( w \cdot MI_1^{-\frac{w-b}{a}} + (1-w) \cdot MI_2^{-\frac{w-b}{a}} \right)^{-a \cdot w^b} \quad \text{(eq. 3)}$$

As proposed by Hagström, a=10.4 and b=0.5 for $MFR_{21}$. Further, unless other experimental information is available, $MFR_{21}/MFR_2$ for one polymer component can be taken as 30. Furthermore, w is the weight fraction of the polymer component having higher MFR. The first copolymer mixture can thus be taken as the component 1 and the third copolymer as the component 2. The $MFR_{21}$ of the third copolymer ($MI_2$) can then be solved from equation 1 when the $MFR_{21}$ of the first copolymer mixture ($MI_1$) and the second copolymer mixture ($MI_b$) are known.

The density of the third copolymer cannot be directly measured. However, by using the standard mixing rule of equation 2 above it can be calculated from the densities of the second copolymer mixture and the first copolymer mixture. Then the subscripts b, 1 and 2 refer to the overall mixture b (=second copolymer mixture), component 1 (=first copolymer mixture) and component 2 (=third copolymer), respectively.

Hydrogen feed is adjusted to achieve a desired melt flow rate (or molecular weight) of the second copolymer mixture. Suitably the hydrogen feed is controlled to maintain constant hydrogen to ethylene ratio in the reaction mixture. The actual ratio depends on the catalyst as well as the type of the polymerization. The desired polymer properties have been obtained in gas phase polymerization in a fluidized bed reactor by maintaining the ratio within the range of from 1 to 20 mol/kmol, preferably from 1 to 10 mol/kmol.

The second alpha-olefin comonomer is typically introduced to maintain a constant comonomer to ethylene ratio in the reaction mixture. The comonomer is an alpha-olefin having from 4 to 10 carbon atoms and may be the same as the first alpha-olefin comonomer or it may be different therefrom. Preferably the second alpha-olefin comonomer is thus 1-butene, 1-hexene or 1-octene. In one preferred embodiment the second alpha-olefin comonomer is the same as the first alpha-olefin comonomer and then more preferably it is 1-butene. In another preferred embodiment the first alpha-olefin comonomer is 1-butene and the second alpha-olefin comonomer is either 1-hexene or 1-octene, more preferably 1-hexene. In the latter preferred embodiment then usually a mixture of the first alpha-olefin comonomer, like 1-butene, and the second alpha-olefin comonomer, like 1-hexene or 1-octene, is present in the third polymerization stage because some comonomer is inevitably carried over from the second polymerization stage into the third polymerization stage. The comonomer to ethylene ratio that is needed to produce a polymer with the desired density depends, among others, on the type of comonomer and the type of catalyst. With 1-butene as a comonomer the desired polymer properties have been obtained in gas phase polymerization in a fluidized bed reactor with a molar ratio of 1-butene to ethylene of from 500 to 1000 mol/kmol, preferably from 600 to 950 mol/kmol and in particular from 650 to 950 mol/kmol.

The desired polymer production rate in the third polymerization stage may be reached by suitably selecting the ethylene concentration in the third polymerization stage, in the same way as was described above for the first polymerization stage.

Preferably the third polymerization stage is conducted as a fluidized bed gas phase polymerization. In a fluidized bed gas phase reactor an olefin is polymerized in the presence of a polymerization catalyst in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are know by using common engineering practise. An overview is given, among others in Geldart: Gas Fluidization Technology, J. Wiley & Sons, 1986.

When the fluidization gas is contacted with the bed containing the active catalyst the reactive components of the gas, such as monomers, comonomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerization reactor is operated at a temperature within the range of from 50 to 100° C., preferably from 65 to 90° C. The pressure is suitably from 10 to 40 bar, preferably from 15 to 30 bar.

The average residence time in the third polymerization stage is typically from 40 to 240 minutes, preferably from 60 to 180 minutes.

As discussed above, it is preferred to conduct the third polymerization stage in gas phase in one or more gas phase reactors, more preferably in one fluidized bed reactor.

The second copolymer mixture typically comprises from 35 to 57% by weight of the first copolymer mixture and from 43 to 65% by weight of the third copolymer.

Extrusion

When the polymer has been removed from the polymerization reactor it is subjected to process steps for removing residual hydrocarbons from the polymer. Such processes are well known in the art and can include pressure reduction steps, purging steps, stripping steps, extraction steps and so on. Also combinations of different steps are possible.

According to one preferred process a part of the hydrocarbons is removed from the polymer powder by reducing the pressure. The powder is then contacted with steam at a temperature of from 90 to 110° C. for a period of from 10 minutes to 3 hours. Thereafter the powder is purged with inert gas, such as nitrogen, over a period of from 1 to 60 minutes at a temperature of from 20 to 80° C.

According to another preferred process the polymer powder is subjected to a pressure reduction as described above. Thereafter it is purged with an inert gas, such as nitrogen, over a period of from 20 minutes to 5 hours at a temperature of from 50 to 90° C. The inert gas may contain from 0.0001 to 5%, preferably from 0.001 to 1%, by weight of components for deactivating the catalyst contained in the polymer, such as steam.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the removal of residual hydrocarbons the polymer is preferably mixed with additives as it is well known in the art. Such additives include antioxidants, process stabilizers, neutralizers, lubricating agents, nucleating agents, antistatic agents, slip agents, antiblocking agents, pigments and so on.

The polymer particles are mixed with additives and extruded to pellets as it is known in the art. Preferably a counter-rotating twin screw extruder is used for the extrusion step. Such extruders are manufactured, for instance, by Kobe and Japan Steel Works. A suitable example of such extruders is disclosed in EP-A-1600276. Typically the specific energy input (SEI) is during the extrusion within the range of from 180 to 230 kWh/ton. The melt temperature is typically from 220 to 290° C.

The Films Made of the Multimodal Ethylene Copolymer

The multimodal ethylene copolymer is a copolymer of ethylene and one or more alpha-olefins having from 4 to 10 carbon atoms. Preferably, the multimodal ethylene copolymer is a copolymer of ethylene with at least one comonomer selected from the group consisting of 1-butene, 1-hexene and 1-octene. More preferably, the multimodal ethylene copolymer is a binary copolymer of ethylene with 1-butene or ethylene with 1-hexene or a ternary copolymer of ethylene with 1-butene and 1-hexene.

The multimodal ethylene copolymer has a density p of from 906 to 916 kg/m$^3$, preferably 910 to 915 kg/m$^3$. The resins having a density of higher than 916 kg/m$^3$ tend to have worse mechanical properties (such as lower dart drop strength and lower tear strength in machine direction) and higher seal initiation temperature than the resins having a density within the claimed range. The resins having a density which is lower than 906 kg/m$^3$ tend to be difficult to produce in a particle form process and there is an increased risk of process disturbance or even shut-down due to the polymer adhering into the surfaces of the process equipment and piping.

The multimodal ethylene copolymer has a melt flow rate $MFR_5$ of from 0.5 to 5.0 g/10 min, preferably from 0.8 to 4.0 g/10 min. The resins having $MFR_5$ of more than 5 g/10 min tend to have too low melt strength to be useful in film extrusion and especially in blown film extrusion. Furthermore, also the mechanical properties, such as dart drop, become worse when the $MFR_5$ is higher. On the other hand, the resins having $MFR_5$ of less than 0.5 g/10 min tend to have so high melt viscosity that it limits the throughput in the film extrusion. Furthermore, if the copolymer has a combination of the melt flow rate $MFR_5$ of more than 5 g/10 min with a density of less than 917 kg/m$^3$ it has been found that the production becomes problematic and process disturbances are more likely to occur.

In addition, the multimodal ethylene copolymer has a flow rate ratio $FRR_{21/2}$ of from 15 to 40, preferably from 20 to 35. Furthermore, it preferably has $MFR_{21}$ of from 20 to 100 g/10 min and more preferably from 25 to 70 g/10 min.

Further, the multimodal ethylene copolymer preferably has a low content of soluble polymer for a given density and melt flow rate of the polymer. Thus, its content of heptane extractable polymer, $X_{C7}$, density $\rho$ and melt flow rate $MFR_5$ preferably meet the relationship:

$$X_{C7} \leq A + B \cdot MFR_5 + C \cdot \rho \quad \text{(eq. 1)}$$

Where A=217.2, B=0.445 and C=−0.234.

The multimodal ethylene copolymer may be blended with additives known in the art. They include antioxidants, process stabilizers, neutralizers, lubricating agents, nucleating agents, pigments, antiblocking agents, slip agents and the like.

In addition, the multimodal ethylene polymer may be blended with other polymers as known in the art for improving certain properties. Such polymers include low density polyethylene (LDPE) produced in a high-pressure process by free-radical polymerization, other linear low density polyethylene, such as those manufactured by using a metallocene catalyst, high density polyethylene, polypropylene, polar copolymers of ethylene, polystyrene, polyamides and so on.

The multimodal ethylene copolymer as described above is used for making films of the present invention. The multimodal ethylene copolymer can be extruded to films according to any method known in the art, such as flat film extrusion or blown film extrusion. The multimodal ethylene copolymer is especially useful for blown film extrusion where the polymer melt is extruded upwards through a circular die. The film is cooled by blowing cold air inside and outside the bubble. The bubble is collapsed at a sufficiently high level by collapsing guides and taken up by pinch rolls. The film is then rolled so that it can be stored and used later. Description of blown film extrusion can be found, for instance, in Raff and Doak, Crystalline Olefin Polymers, Part II (John Wiley & Sons, 1964) pages 426 to 443.

The films may be monolayer films or they can be multilayered films. In multilayered films the multimodal ethylene copolymer may be present in any one of the layers. It may also be present in more than one layer, such as in all of the layers. Preferably, the multimodal ethylene copolymer is present in a sealing layer of sealable films. The sealing layer is one or both of the outmost layers of a multi-layered structure. Sealable films and sealing are discussed, among others, in the above-mentioned book of Raff and Doak on pages 536 to 544.

The films comprising the multimodal ethylene copolymer have a thickness of from 5 to 100 μm, preferably from 10 to 75 μm and more preferably from 10 to 50 μm. They may have one or preferably multiple layers, such as three or five layers. In addition, they may include adhesion layers to improve the adhesion between the main layers. If the films are multilayer films the layers not comprising the multimodal ethylene copolymer may comprise other suitable polymers, such as one or more polymers selected from low density polyethylene produced in a free-radical process; linear low density polyethylene which may be unimodal or multimodal and which has a higher density than the multimodal ethylene copolymer; medium density polyethylene and high density polyethylene, both of which may be unimodal or multimodal; and polypropylene. The layers may also contain blends of the above-mentioned polymers with other polymers, or blends of two or more above-listed polymers. Each of the film layers may have a thickness as described above.

The multimodal ethylene copolymer is preferably present in at least one of the layers in an amount of 40 to 100% by weight, based on the total amount of polymers in the layer. More preferably, the multimodal ethylene copolymer is present in at least one of the layers in an amount of from 50 to 100% and even more preferably in an amount of from 75 to 100%.

The multimodal ethylene copolymer may be present in an external layer of the film. Especially, the multimodal ethylene copolymer is present in the amounts as described above.

The multimodal ethylene copolymer may also be present in an internal layer of the film. Thus, according to an embodiment a layer comprising the multimodal ethylene copolymer is present as an internal layer sandwiched between layers of lower density ethylene copolymers produced in the presence of a metallocene catalyst.

The films according to the present invention can be heat sealed to form heat sealed articles. Such articles are suitably used, for instance, packaging foodstuff, liquids, detergents and the like.

Benefits of the Invention

The process of the invention is capable of producing multimodal ethylene copolymers having a reduced density. The films produced from the polymer have a good combination of mechanical properties and processability.

The process is reliable and the polymeric product is produced with a low frequency of disturbances and a high productivity.

Statements for the Film of the Invention

1. A film comprising a multimodal ethylene copolymer, said multimodal ethylene copolymer having:
   a density ρ of from 906 to 920 kg/m$^3$;
   a melt flow rate MFR$_5$ of from 0.5 to 5.0 g/10;
   a melt flow rate MFR$_{21}$ of from 25 to 100 g/10; and
   a flow rate ratio FRR$_{21/5}$ of from 15 to 35.

2. The film according to statement 1 wherein the film comprises multiple layers.

3. The film according to statement 1 or statement 2 wherein the film comprises a layer comprising from 40 to 100% of said multimodal ethylene copolymer.

4. The film according to any one of the statements 1 to 3 wherein the density of the multimodal ethylene copolymer is from 906 to 916 kg/m$^3$, preferably from 910 to 915 kg/m$^3$.

5. The film according to any one of the statements 1 to 4 wherein the thickness of the film is from 5 to 100 μm.

6. The use of a multimodal ethylene copolymer having
   a density ρ of from 906 to 920 kg/m$^3$;
   a melt flow rate MFR$_5$ of from 0.5 to 5.0 g/10;
   a melt flow rate MFR$_{21}$ of from 25 to 100 g/10; and
   a flow rate ratio FRR$_{21/5}$ of from 15 to 35
   for making films.

7. The use according to statement 6 wherein the density of the multimodal ethylene copolymer is from 906 to 916 kg/m$^3$, preferably from 910 to 915 kg/m$^3$.

Description of Methods

Melt Flow Rate

Melt flow rate (MFR) was determined according to ISO 1133 at 190° C. The load under which the measurement is conducted is given as a subscript. Thus, the MFR under the load of 2.16 kg is denoted as MFR$_2$. The melt flow rate MFR$_{21}$ is correspondingly determined at 190° C. under a load of 21.6 kg and MFR$_5$ under a load of 5 kg.

The melt index MFR is herein assumed to follow the following mixing rule (equation 3):

$$MI_b = \left( w \cdot MI_1^{-\frac{w-b}{a}} + (1-w) \cdot MI_2^{-\frac{w-b}{a}} \right)^{-a \cdot w^b} \quad \text{(eq. 3)}$$

Where a=10.4 and b=0.5, w is the weight fraction of the component having the higher MFR in the mixture, MI is the melt index MFR$_{21}$ and subscripts b, 1 and 2 refer to the mixture b, component 1 and component 2, respectively.

Density

Density of the polymer was measured according to ISO 1183-1:2004 Method A on compression moulded specimen prepared according to EN ISO 1872-2 (February 2007) and is given in kg/m$^3$.

The density is herein assumed to follow the mixing rule (equation 2):

$$\rho_b = w_1 \cdot \rho_1 + w_2 \cdot \rho_2 \quad \text{(eq. 2)}$$

Where ρ is the density in kg/m$^3$, w is the weight fraction of the component in the mixture and subscripts b, 1 and 2 refer to the overall mixture b, component 1 and component 2, respectively.

Heptane Soluble Polymer

The amount of heptane soluble polymer was measured from stabilized powder samples which were collected after the powder had been mixed with the additives and before the extrusion step. The samples had been maintained in an open container in a well ventilated space at room temperature and pressure for a period of at least four weeks.

10 g (9.5 g-10.5 g with accuracy of 0.1 mg) of sample is weighed (=W1) into a 300 ml Erlenmeyer flask, with a magnetic stir bar and 100 ml of n-heptane added in. The flask is closed with a glass stopper. After that, stirring begins and lasts for 30 min at 23° C. Then the solution is filtered (filter: Macherey-Nagel MN 617 ¼) into a 500 ml round bottom flask that has been dried at 110° C. in vacuum for at least 3 hours and weighed, after cooling down to 23° C. in a desiccator to the constant weight (W2).

The Erlenmeyer flask and the residue in the filter are washed with n-heptane (about 10 ml for 3 times). The scrubbing solution is also filtered into the round bottom flask. Thereafter the solution in the round bottom flask is evaporated until dryness under N2 stream in the rotary evaporator at about 80° C.

The residue is then dried in a vacuum oven at 90° C. overnight and cooled in a desiccator to room temperature till a constant weight (W3).

The n-heptane soluble is calculated using the following formula:

$n$-Heptane soluble (wt %)=(W3−W2)×100/W1

Elmendorf Tear Strength

The tear strength is measured using the ISO 6383/2 method from the film samples. The force required to propagate tearing across a film specimen is measured using a pendulum device. The pendulum swings under gravity through an arc, tearing the specimen from pre-cut slit. The specimen is fixed on one side by the pendulum and on the other side by a stationary clamp. The tear strength is the force required to tear the specimen.

Dart Drop Strength

Dart-drop is measured using ISO 7765-1, method "A" from the film samples. A dart with a 38 mm diameter hemispherical head is dropped from a height of 0.66 m onto a film clamped over a hole. If the specimen fails, the weight of the dart is reduced and if it does not fail the weight is increased. At least 20 specimens are tested. The weight resulting in failure of 50% of the specimens is calculated.

EXAMPLES

Catalyst Preparation

Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

275 kg silica (ES747JR of Crossfield, having average particle size of 20 μm) activated at 600° C. in nitrogen was charged into a catalyst preparation reactor. Then, 411 kg 20% EADC (2.0 mmol/g silica) diluted in 555 liters pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg TiCl$_4$ was added during 0.5 hours at 45° C. The slurry was stirred at 40° C. for five hours. The catalyst was then dried by purging with nitrogen.

Example 1

A loop reactor having a volume of 50 dm³ was operated at a temperature of 70° C. and a pressure of 62 bar. Into the reactor were ethylene, 1-butene, propane diluent and hydrogen so that the feed rate of ethylene was 2.0 kg/h, hydrogen was 5.0 g/h, 1-butene was 80 g/h and propane was 53 kg/h. Also 8.2 g/h of a solid polymerization catalyst component produced as described above was introduced into the reactor together with triethylaluminium cocatalyst so that the molar ratio of Al/Ti was about 18. The production rate was 1.9 kg/h.

A stream of slurry was continuously withdrawn and directed to a loop reactor having a volume of 150 dm³ and which was operated at a temperature of 85° C. and a pressure of 61 bar. Into the reactor were fed additional ethylene, propane diluent, 1-butene comonomer and hydrogen so that the ethylene concentration in the fluid mixture was 8.1% by mole, the hydrogen to ethylene ratio was 380 mol/kmol, the 1-butene to ethylene ratio was 180 mol/kmol and the propane feed was 44 kg/h. The ethylene copolymer withdrawn from the reactor had $MFR_2$ of 270 g/10 min and density of 949 kg/m³. The production rate was 15 kg/h.

A stream of slurry from the reactor was withdrawn intermittently and directed into a loop reactor having a volume of 350 dm³ and which was operated at 85° C. temperature and 54 bar pressure. Into the reactor was further added 48 kg/h of propane and ethylene, 1-butene and hydrogen so that the ethylene content in the reaction mixture was 3.9 mol-%, the molar ratio of 1-butene to ethylene was 590 mol/kmol and the molar ratio of hydrogen to ethylene was 330 mol/kmol. The ethylene copolymer withdrawn from the reactor had $MFR_2$ of 430 g/10 min and density of 952 kg/m³. The production rate was 24 kg/h.

The slurry was withdrawn from the loop reactor intermittently by using settling legs and directed to a flash vessel operated at a temperature of 50° C. and a pressure of 3 bar. From there the polymer was directed to a gas phase reactor operated at a pressure of 20 bar and a temperature of 80° C. Additional ethylene, 1-butene comonomer, nitrogen as inert gas and hydrogen were added so that the ethylene content in the reaction mixture was 17 mol-%, the ratio of hydrogen to ethylene was 3 mol/kmol and the molar ratio of 1-butene to ethylene was 910 mol/kmol. The polymer production rate in the gas phase reactor was 62 kg/h and thus the total polymer withdrawal rate from the gas phase reactor was about 100 kg/h. The polymer had a melt flow rate $MFR_5$ of 1.6 g/10 min and a density of 914 kg/m³. The production split (weight-% prepolymer/weight-% $1^{st}$ stage component/weight-% $2^{nd}$ stage component/weight-% $3^{rd}$ stage component) was 2/15/23/60.

The polymer powder was mixed under nitrogen atmosphere with 500 ppm of Ca-stearate and 1200 ppm of Irganox B225. Then it was compounded and extruded under nitrogen atmosphere to pellets by using a CIMP90 extruder so that the SEI was 220 kWh/ton and the melt temperature 250° C.

Examples 2 to 9

The procedure of Example 1 was followed except that the operation conditions in the loop reactor and the gas phase reactor were modified as shown in Table 1.

Comparative Examples 1 and 2

The procedure of Example 1 was followed except that the operation conditions were as shown in Table 2.

Examples F2, F5, F7 F8 and F9 and Comparative Examples CF1 and CF2

The polymers of the Examples 2, 5, 7, 8 and 9 and Comparative Examples 1 and 2 were extruded to films having a thickness of 40 μm on a Windmöller and Hölscher (W&H) mono layer blown film line with a Varex E60.30D extruder, cylinder diameter of 60 mm, screw length to diameter ratio of 30, die diameter of 200 mm, die gap of 1.2 mm, BUR 1:3, frostline height of 700 mm and a throughput of 80 kg/hr utilising the following barrel temperature profile according to the $MFR_5$ of the material.

| | | | | | | | | | | |
|---|---|---|---|---|---|---|---|---|---|---|
| MFR > 1.2-2.0: | 80 | 160 | 180 | 180 | 180 | 180 | 180 | 180 | 180 | ° C. |
| MFR > 2.0-5.0: | 80 | 150 | 160 | 160 | 160 | 160 | 160 | 160 | 160 | ° C. |

TABLE 1

Conditions for Examples 1 to 9

| | EX | | | | | | | | |
|---|---|---|---|---|---|---|---|---|---|
| | 1 | 2 | 3 | 4 | 5 | 6 | 7 | 8 | 9 |
| $1^{st}$ loop | | | | | | | | | |
| $C_2$, mol-% | 8.1 | 4.0 | 7.0 | 9.9 | 6.9 | 4.6 | 2.4 | 2.4 | 2.5 |
| $H_2/C_2$, mol/kmol | 380 | 290 | 280 | 490 | 245 | 370 | 610 | 610 | 650 |
| $C_4/C_2$, mol/kmol | 180 | 530 | 251 | 41 | 240 | 210 | 400 | 400 | 430 |
| $MFR_{21}$, g/10 min | 270 | 180 | 230 | 290 | 200 | 120 | N/A[2] | N/A[2] | N/A[2] |
| Density, kg/m³ | 949 | 951 | 952 | 950 | 950 | 951 | N/A[2] | N/A[2] | N/A[2] |
| $2^{nd}$ loop | | | | | | | | | |
| $C_2$, mol-% | 3.9 | 2.3 | 4.1 | 4.1 | 4.1 | 4.1 | 4.3 | 4.7 | 4.2 |
| $H_2/C_2$, mol/kmol | 330 | 240 | 340 | 330 | 330 | 330 | 320 | 340 | 380 |

TABLE 1-continued

Conditions for Examples 1 to 9

| | EX | | | | | | | | |
|---|---|---|---|---|---|---|---|---|---|
| | 1 | 2 | 3 | 4 | 5 | 6 | 7 | 8 | 9 |
| $C_4/C_2$, mol/kmol | 590 | N/A[2] | 630 | 590 | 650 | 650 | 640 | 570 | 710 |
| $MFR_2$, g/10 min | 430 | 360 | 300 | 340 | 360 | 360 | 300 | 240 | 340 |
| Density, kg/m³ | 952 | 948 | 952 | 952 | 951 | 951 | 951 | 952 | 951 |
| GPR | | | | | | | | | |
| $C_2$, mol-% | 17 | 10 | 17 | 17 | 17 | 17 | 17 | 18 | 18 |
| $H_2/C_2$, mol/kmol | 3 | 1 | 3 | 3 | 3 | 3 | 4 | 3 | 3 |
| $C_4/C_2$, mol/kmol | 910 | 740 | 890 | 900 | 900 | 900 | 880 | 880 | 880 |
| Extrusion | | | | | | | | | |
| SEI, kWt/h | 220 | | 200 | 200 | 200 | 200 | 200 | 210 | 220 |
| Melt temp., °C. | 250 | | 240 | 240 | 240 | 230 | 240 | 240 | 250 |
| Final | | | | | | | | | |
| Split[3] | 2/15/24/59 | 2/23/31/44 | 2/16/23/59 | 2/13/24/61 | 2/15/23/60 | 2/17/23/58 | 2/19/23/57 | 2/20/24/54 | 2/18/22/58 |
| $MFR_5$, g/10 min | 1.6[1] | 4.7 | 1.7 | 1.8 | 2.1 | 1.9 | 2.1 | 1.9 | 2.7 |
| $MFR_{21}$, g/10 min | 33[1] | 100 | 35 | 37 | 43 | 39 | 42 | 40 | 58 |
| Density, kg/m³ | 914[1] | 915 | 916 | 915 | 915 | 913 | 913 | 916 | 917 |

Notes:
[1] Measured from powder
[2] Not analyzed
[3] Given as % prepoly material/% 1$^{st}$ loop material/% 2$^{nd}$ loop material/% gas phase reactor (GPR) material

TABLE 2

Conditions for Comparative Examples 1 and 2:

| Comp. Ex. | 3 | 4 |
|---|---|---|
| 1$^{st}$ loop | | |
| $C_2$, mol-% | 4.1 | 5.1 |
| $H_2/C_2$, mol/kmol | 320 | 230 |
| $C_4/C_2$, mol/kmol | 490 | 380 |
| $MFR_{21}$, g/10 min | 180 | 180 |
| Density, kg/m³ | 948 | 944 |
| 2$^{nd}$ loop | | |
| $C_2$, mol-% | 3.8 | 4.0 |
| $H_2/C_2$, mol/kmol | 420 | 400 |
| $C_4/C_2$, mol/kmol | 700 | 720 |
| $MFR_2$, g/10 min | 330 | 270 |
| Density, kg/m³ | 951 | 953 |
| GPR | | |
| $C_2$, mol-% | 13 | 11 |
| $H_2/C_2$, mol/kmol | 6 | 6 |
| $C_4/C_2$, mol/kmol | 670 | 810 |
| Final | | |
| Split [1] | 2/20/22/56 | 1/21/22/56 |
| $MFR_5$, g/10 min | 1.6 | 3.6 |
| $MFR_{21}$, g/10 min | 34 | 77 |
| Density, kg/m³ | 923 | 921 |

[1] Given as % prepoly material/% 1$^{st}$ loop material/% 2$^{nd}$ loop material/% GPR material

TABLE 3

Data measured from the films of Examples 2, F5 and F7 to F9:

| Example | MD Tear N | TD Tear N | DDI g |
|---|---|---|---|
| F2 | 61 | 176 | 187 |
| F5 | 79 | 178 | 357 |
| F7 | 93 | 182 | 399 |
| F8 | 93 | 185 | 311 |
| F9 | 86 | 177 | 261 |

TABLE 4

Data measured from the films of Comparative Examples CF1 and CF2:

| Example | MD Tear N | TD Tear N | DDI g |
|---|---|---|---|
| CF1 | 43 | 210 | 202 |
| CF2 | 43 | 187 | 156 |

TABLE 5

The amount of heptane extractable polymer.

| Example | Density kg/m³ | $MFR_5$ g/10 min | Limit weight-% | Heptane extractables, weight-% |
|---|---|---|---|---|
| 1 | 913.7 | 1.6 | 4.25 | 3.56 |
| 2 | 915.3 | 4.7 | 5.26 | 4.9 |
| 5 | 915.0 | 2.1 | 4.17 | 3.89 |
| 8 | 915.5 | 1.9 | 3.96 | 3.66 |
| 9 | 916.5 | 2.7 | 4.09 | 3.43 |

The invention claimed is:

1. A process for producing copolymers of ethylene and at least one alpha-olefin having from 4 to 10 carbon atoms in the presence of a polymerization catalyst, the copolymer having a density of from 906 to 920 kg/m³ and a melt flow rate $MFR_5$ measured at 190° C. under 5 kg load of from 0.5 to 5.0 g/10 min in three polymerization stages comprising the steps of copolymerizing ethylene and a first alpha-olefin having from 4 to 10 carbon atoms in a first polymerization stage in the presence of the polymerization catalyst to produce particles of a first copolymer of ethylene having a density of from 945 to 955 kg/m³ and a melt flow rate $MFR_2$ measured at 190° C. under 2.16 kg load of from 150 to 1000 g/10 min;

copolymerizing ethylene and the first alpha-olefin in a second polymerization stage in the presence of the first copolymer of ethylene to produce particles of a first copolymer mixture comprising the first copolymer of ethylene and a second copolymer of ethylene, the first copolymer mixture having a density of from 945 to 955 kg/m³ and a melt flow rate MFR$_2$ of from 150 to 1000 g/10 min;

copolymerizing ethylene and a second alpha-olefin in a third polymerization stage in the presence of the first copolymer mixture to produce particles of a second copolymer mixture comprising the first copolymer mixture and a third copolymer of ethylene, the second copolymer mixture having a density of from 906 to 920 kg/m³ and a melt flow rate MFR$_5$ of from 0.5 to 5.0 g/10 min;

recovering the second copolymer mixture.

2. The process according to claim 1 wherein the first copolymer mixture comprises from 25 to 60% by weight of the first copolymer and from 40 to 75% by weight of the second copolymer.

3. The process according to claim 1 wherein the second copolymer mixture comprises from 35 to 57% by weight of the first copolymer mixture and from 43 to 65% by weight of the third copolymer.

4. The process according to claim 1 wherein the density of the second copolymer mixture is from 906 to 916 kg/m³.

5. The process according to claim 1 wherein the melt flow rate MFR$_2$ of the first copolymer mixture is from 200 to 600 g/10 min.

6. The process according to claim 1 wherein the melt flow rate MFR$_5$ of the second copolymer mixture is from 0.8 to 4.0 g/10 min.

7. The process according to claim 6 wherein the melt flow rate MFR$_{21}$ of the second copolymer mixture is from 25 to 100 g/10 min.

8. The process according to claim 1 wherein the first, second and third polymerization stages are conducted continuously.

9. The process according to claim 8 wherein the first and second polymerization stages are conducted in slurry in loop reactors.

10. The process according to claim 8 wherein the third polymerization stage is conducted in gas phase in a fluidized bed reactor.

11. The process according to claim 8 comprising the additional steps of:

withdrawing a stream comprising a first fluid reaction mixture and the first copolymer from the first polymerization stage and passing said stream into the second polymerization stage;

withdrawing a stream comprising a second fluid reaction mixture and the first copolymer mixture from the second polymerization stage and passing it to a separation stage;

withdrawing from said separation stage a first stream which is substantially free of the first copolymer mixture and comprises the second fluid reaction mixture and a second stream which comprises the first copolymer mixture and a reduced content of the second fluid reaction mixture;

passing said second stream to the third polymerization stage, and passing at least a part of said first stream to hydrocarbon recovery or returning at least a part of said first stream to the first polymerization stage or to the second polymerization stage.

12. The process according to claim 8 comprising the additional steps of adding at least one additive to the second copolymer mixture and extruding the second copolymer mixture to pellets.

13. The process according to claim 8 wherein the first alpha-olefin is 1-butene and the second alpha-olefin is selected from the group consisting of 1-butene, 1-hexene and 1-octene.

14. The process according to claim 1 wherein the polymerization catalyst comprises (i) a solid component comprising a titanium compound and a magnesium compound and (ii) a cocatalyst.

15. The process according to claim 14 wherein the cocatalyst is an aluminium alkyl.

16. The process according to claim 1 wherein the first copolymer mixture comprises from 30 to 60% of the first copolymer and from 40 to 70%, of the second copolymer.

17. The process according to claim 1 wherein the density of the second copolymer mixture is from 910 to 915 kg/m³.

18. The process according to claim 14 wherein the cocatalyst is aluminium trialkyl.

* * * * *